(12) United States Patent
Makitani et al.

(10) Patent No.: US 6,229,620 B1
(45) Date of Patent: *May 8, 2001

(54) IMAGE PROCESSING APPARATUS AND METHOD THEREOF

(75) Inventors: Hideyuki Makitani, Fuchu; Masanori Miyata, Yokohama; Shinichi Nakamura, Kawasaki; Chikara Sato, Hachioji; Kenji Kobayashi, Tokyo; Katsuya Yamazaki, Kawasaki; Yasuo Fukazu, Tokyo; Masaaki Inoo, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/697,589

(22) Filed: Aug. 27, 1996

(30) Foreign Application Priority Data

Aug. 29, 1995 (JP) ....................................... 7-220516
Dec. 20, 1995 (JP) ....................................... 7-332066

(51) Int. Cl.⁷ .................................................. G06F 15/00
(52) U.S. Cl. .................. 358/1.15; 358/1.13; 358/1.16; 358/296; 358/400; 358/406; 358/434; 358/435; 358/439
(58) Field of Search .................................... 395/109, 112, 395/114; 358/407, 296, 442, 448, 450, 468, 405, 400, 403, 404, 435, 436, 438, 439, 401, 1.9, 1.13, 1.15, 1.16; 380/18

(56) References Cited

U.S. PATENT DOCUMENTS

| | | | | |
|---|---|---|---|---|
| 5,386,303 | * | 1/1995 | Kihara | 358/405 |
| 5,404,231 | * | 4/1995 | Bloomfield | 358/405 |
| 5,581,613 | * | 12/1996 | Nagashima et al. | 380/18 |
| 5,596,640 | * | 1/1997 | Ohta | 380/18 |
| 5,673,373 | * | 9/1997 | Nosaki et al. | 395/114 |
| 5,717,501 | * | 2/1998 | Iwamoto et al. | 358/401 |
| 5,732,161 | * | 3/1998 | Kuroda et al. | 358/450 |
| 5,771,101 | * | 6/1998 | Brammall | 358/405 |
| 6,094,276 | * | 7/2000 | Yamaguchi et al. | 358/1.15 |

* cited by examiner

Primary Examiner—Edward Coles
Assistant Examiner—Mark Wallerson
(74) Attorney, Agent, or Firm—Morgan & Finnegan, LLP

(57) ABSTRACT

The present invention provides an image processing apparatus which comprises connection means for connecting to a computer, input means for inputting image data from the computer via the connection means, and output means for visibly outputting the image data input by the input means, comprises generation means for generating a code, notification means for notifying the code generated by the generation means, to the computer from which the image data is input by the input means, and storage means for storing the image data input by the input means, wherein the output means visibly outputs the image data input by the input means, in a case where a code corresponding to the code generated by the generation means is input, whereby a secret of the output image can effectively be protected.

34 Claims, 15 Drawing Sheets

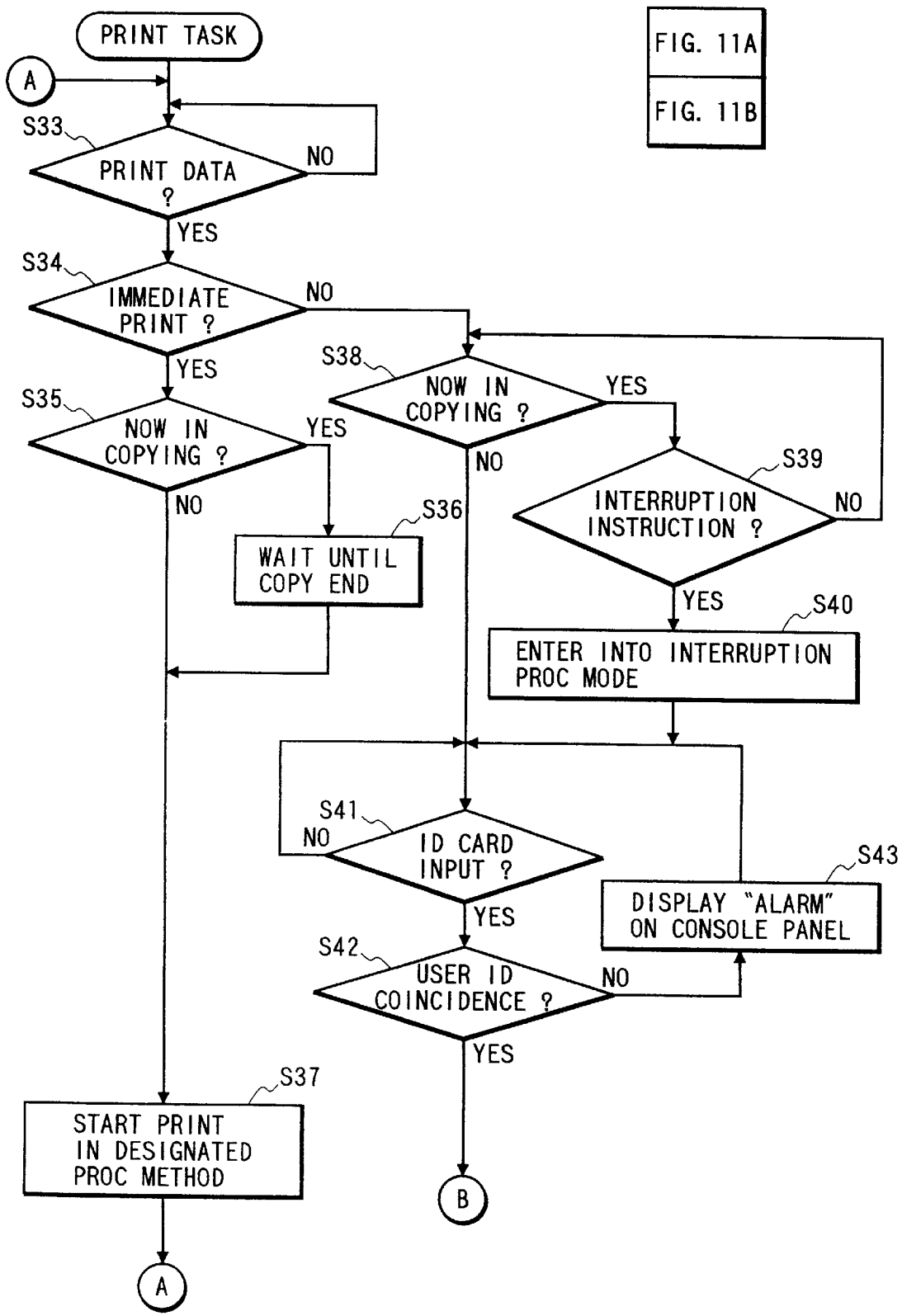

IMAGE PROCESSING APPARATUS AND METHOD THEREOF

BACKGROUND OF THE INVENTION

1. Field of the Invention

The present invention relates to image processing apparatus and method for processing image data, and more particularly to the image processing apparatus and method for visibly outputting the image data transmitted from an external apparatus such as a computer or the like.

2. Related Background Art

Conventionally, it has been known that a computer is connected to an apparatus of this type, e.g., a printer apparatus, via an external interface, document data or the like generated by the computer is input to the printer apparatus, and then the input document data is printed out on a recording paper (or sheet) as an invisible image. In this case, a computer side transmits image data to the printer apparatus as well as a print instruction, and the printer apparatus to which the print instruction is transmitted sequentially records or outputs on the recording paper an image based on the transmitted image data.

However, in such a conventional case, when a secret (or confidential) document is to be output, if the computer is placed apart from the printer apparatus, it is feared that an output paper can be seen by an another person (or stranger) until a user comes to the printer apparatus to take the output paper.

Further, in a case where the image data is transferred from the computer to a copy machine having a printer function, if a third person is carrying out a copy operation, there is a problem that the user cannot know when the transferred image data is output.

Furthermore, in a case where there is a single output paper discharge tray in the printer apparatus, various output papers are output at random on the paper discharge tray, so that the output papers remain on the tray without sorting out or grouping them. Moreover, in an apparatus such as an image formation apparatus having a plurality of functions, e.g., printer function, facsimile function, copy function and the like, even if a single discharge tray is not provided but a plurality of discharge trays are provided respectively corresponding to these functions, any means for sorting out or grouping independently-output sets of papers is not provided on the discharge tray corresponding to any one function. Therefore, since the output papers from such the apparatus are placed at random on the discharge tray, the user cannot discriminate which set of papers is a desired one.

Therefore, in case of taking the desired set of papers, the user must reluctantly take all of the sets of papers from the tray at one time, look for the desired set and then return the remaining sets to the discharge tray. Under such a condition, it is feared that all or part of the output documents are lost.

SUMMARY OF THE INVENTION

An object of the present invention is to provide image processing apparatus and method for solving the above-mentioned problems.

Another object of the present invention is to provide image processing apparatus and method for easily protecting a secret of an output image.

Still another object of the present invention is to provide image processing apparatus and method capable of outputting output papers at a timing desired by an operator.

The above and other objects of the present invention will be apparent from the following description in conjunction with the drawings.

DETAILED DESCRIPTION OF PREFERRED EMBODIMENTS

It will be explained hereinafter the embodiments of the present invention with reference to the attached drawings.

First Embodiment

Figure 1:
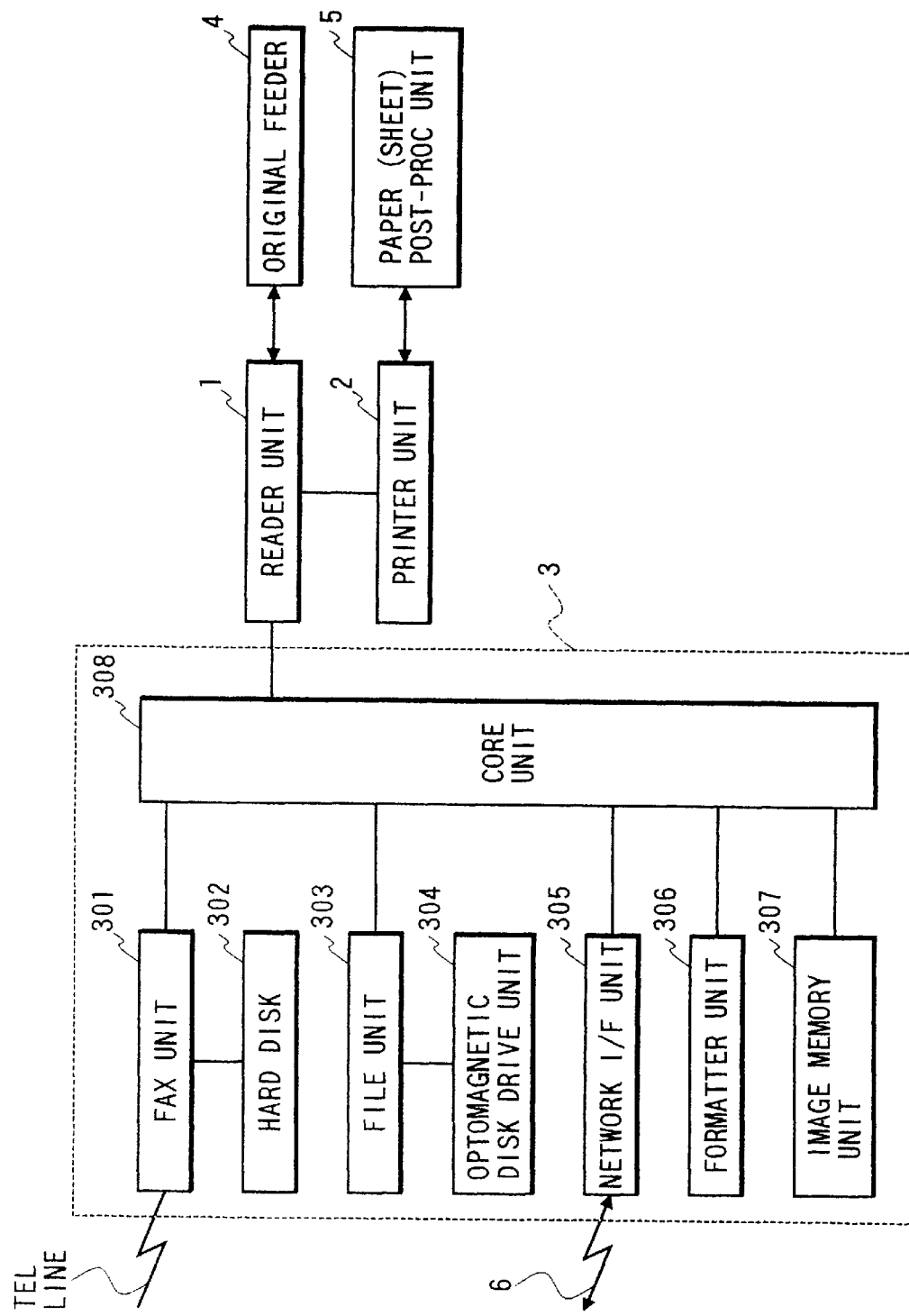
FIG. 1 is a block diagram showing a construction of an image formation apparatus according to a first embodiment.

FIG. 1 is a block diagram showing a construction of an image formation apparatus according to the first embodiment of the present invention. A reader unit 1 reads an original image and outputs image data according to the original image to a printer unit 2 and an image input/output control unit 3. The image input/output control unit 3 is connected to the reader unit 1, and consists of a facsimile unit 301, a file unit 303, a network interface unit 305, a formatter unit 306, an image memory unit 307, a core unit 308 and the like. An original feeder 4 is connected to the reader unit 1, and a paper (sheet) post-process unit 5 is connected to the printer unit 2. The original feeder 4 and the paper (sheet) post-process unit 5 are both detachable. In this case, in a case where the image formation apparatus is utilized as a stand-alone copy machine, the image input/output control unit 3 may be omitted.

The facsimile unit 301 expands compressed image data received via a telephone line, and transfers the expanded image data to the core unit 308. Further, the facsimile unit 301 compresses the image data transferred from the core unit 308, and transmits the compressed image data via the telephone line. A hard disk 302 is connected to the facsimile unit 301, whereby the received compressed image data can temporarily be stored in the hard disk 302. An optomagnetic disk drive unit 304 is connected to the file unit 303. The file unit 303 compresses the image data transferred from the core unit 308, and then stores the compressed image data together with a keyword for searching it in an optomagnetic disk which is set on the optomagnetic disk drive unit 304. Further, the file unit 303 searches the compressed image data stored in the optomagnetic disk on the basis of the keyword transferred via the core unit 308, reads and expands the searched image data, and then transfers the expanded image data to the core unit 308. The network interface unit 305 acts as an interface between a personal computer (PC) or work station (WS) (to be referred as a PC/WS hereinafter) connected to a local area network (LAN) 6 and the core unit 308. The formatter unit 306 develops code data representing an image transferred from the PC/WS to the image data which can be recorded by the printer unit 2. The image memory unit 307 temporarily stores the data transferred from the PC/WS. Although the core unit 308 will be explained later in detail, the core unit 308 is used to control data flows among the reader unit 1, the facsimile unit 301, the file unit 303, the network interface unit 305, the formatter unit 306 and the image memory unit 307.

Figure 2:
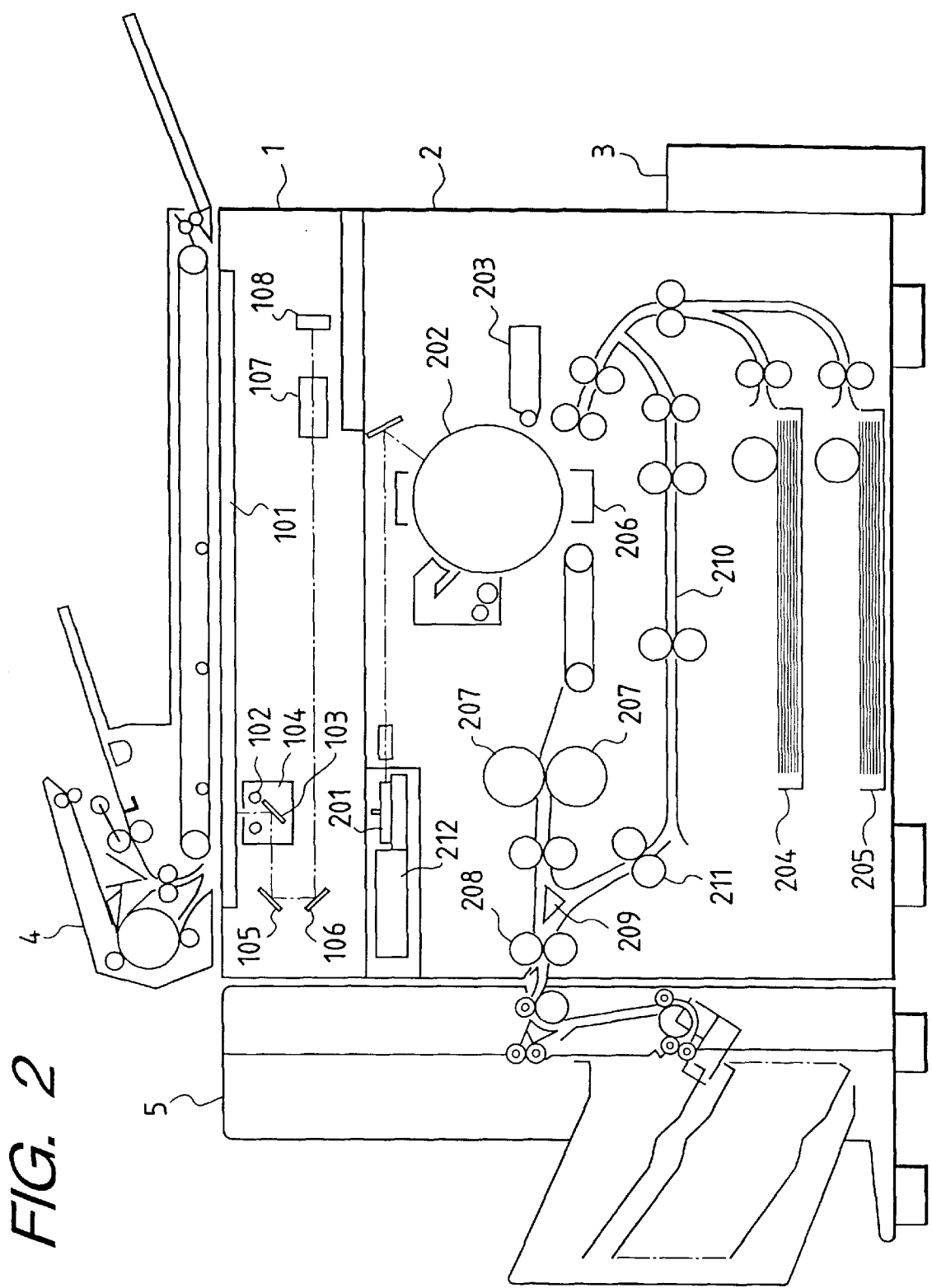
FIG. 2 is a sectional view showing a reader unit 1 and a printer unit 2.

FIG. 2 is a sectional view showing the reader unit 1 and the printer unit 2. The original feeder 4 provided on the reader unit 1 feeds an original from its final page sequentially one by one onto a platen glass 101, and discharges the original on the platen glass 101 after a reading operation of the original terminates. When the original is fed onto the platen glass 101, a lamp 102 is turned on. Then, a scanner unit 104 starts in moving to perform an exposure scan of the original. In this case, a reflected light from the original is introduced into a CCD image sensor (to be referred as a CCD hereinafter) 108 by means of mirrors 103, 105 and 106 and a lens 107, whereby the image of the scanned original is read by the CCD 108. Image data output from the CCD 108 is subjected to a predetermined process and then transferred to the printer unit 2 and the core unit 308 in the image input/output control unit 3.

In the above operation, it should be noted that it is not always necessary to read the original by using the original feeder 4. That is, the original may be directly placed on the platen glass 101 by lifting up the original feeder 4 which also acts as an original pressure board.

A laser driver 212 in the printer unit 2 is to drive a laser beam generation unit 201. That is, the laser driver 212 causes the laser beam generation unit 201 to generate a laser beam according to the image data output from the reader unit 1. The laser beam is irradiated to a photosensitive drum 202, so that a latent image according to the laser beam is formed on the photosensitive drum 202. A developer is adhered or added to a latent-image portion on the drum 202 by a development unit 203. A recording paper is fed from either one of cassettes 204 and 205 to a transfer unit 206 at a timing in synchronism with an irradiation start timing of the laser beam, to transfer the developer adhered on the photosensitive drum 202 onto the recording paper. The recording paper on which the developer is transferred is fed to a fixing unit 207, so that the developer is fixed to the recording paper due to heat and pressure caused by the fixing unit 207. The recording paper after passing through the fixing unit 207 is discharged by discharge rollers 208. Then, the paper (sheet) post-process unit 5 sorts the discharged recording papers by holding them in respective bins. Further, the unit 5 performs a stapling process in accordance with a user's instruction. In a case where a sorting process is not being set, the paper (sheet) post-process unit 5 holds the recording papers in the most-upper bin. In a case where a two-face recording is being set, the paper (sheet) post-process unit 5 feeds the recording paper up to the discharge rollers 208 and thereafter reverses a rotational direction of the discharge rollers 208 to introduce the recording paper to a paper re-feed path by using a flapper 209. In a case where a multiple recording is being set, the paper (sheet) post-process unit 5 introduces the recording paper to the paper re-feed path by using the flapper 209 such that the recording paper is not fed up to the discharge rollers 208. The recording paper introduced into the paper re-feed path is again fed to the transfer unit 206 at the timing explained above.

Further, in a case where the paper (sheet) post-process unit 5 is not used, a tray is provided to receive the recording papers directly discharged from the discharge rollers 208.

Figure 3:
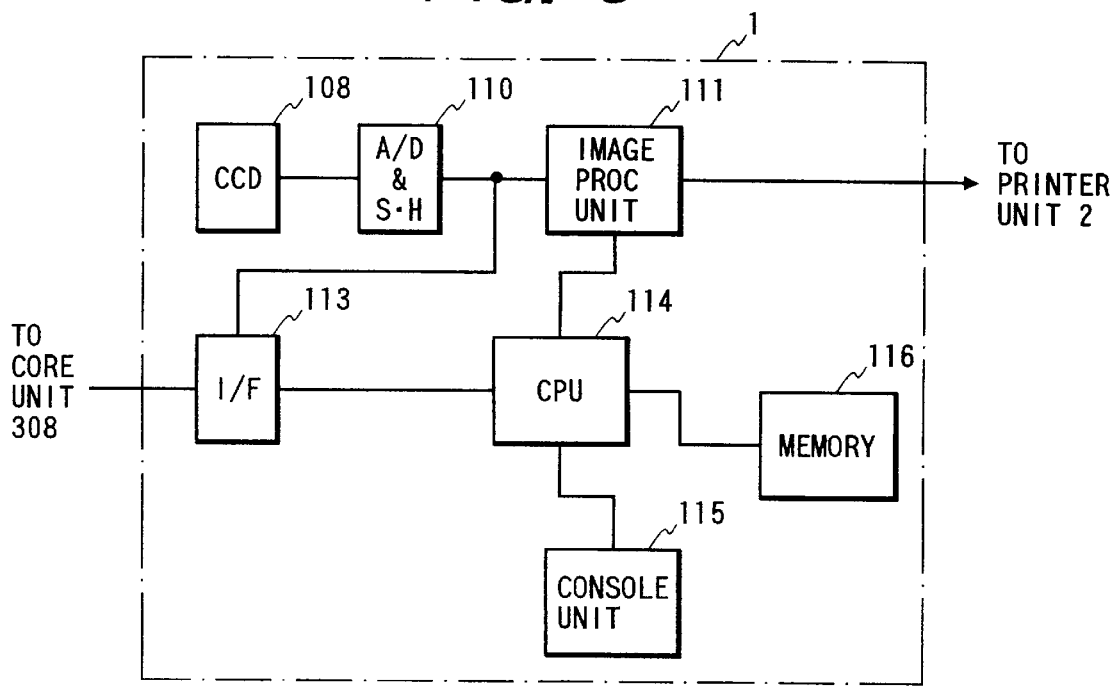
FIG. 3 is a block diagram showing a construction of the reader unit 1.

FIG. 3 is a block diagram showing the reader unit 1. Image data output from a CCD 108 is analog-to-digital converted and also shading corrected by an analog-to-digital conversion and shading correction unit 110 (to be referred as A/D & SH unit 110 hereinafter). The image data processed by the A/D & SH unit 110 is transferred to the printer unit 2 via an image process unit 111 and also transferred to the core unit 308 in the image input/output control unit 3 via an interface 113. A central process unit (CPU) 114 controls the image process unit 111 and the interface 113 in accordance with contents set by a console unit 115. For example, in a case where a copy mode for performing a trimming process and then a copy operation is being set by the console unit 115, the image data is subjected to the trimming process by the image process unit 111 and then transferred to the printer unit 2. On the other hand, in a case where a facsimile transmission mode is being set by the console unit 115, the image data and a control command according to the set mode are transferred from the interface 113 to the core unit 308. A control program of the CPU 114 for performing above operations has been stored in a memory 116, so that the CPU 114 performs controlling with referring to the memory 116. It should be noted that the memory 116 is used as a working area of the CPU 114.

Figure 4:
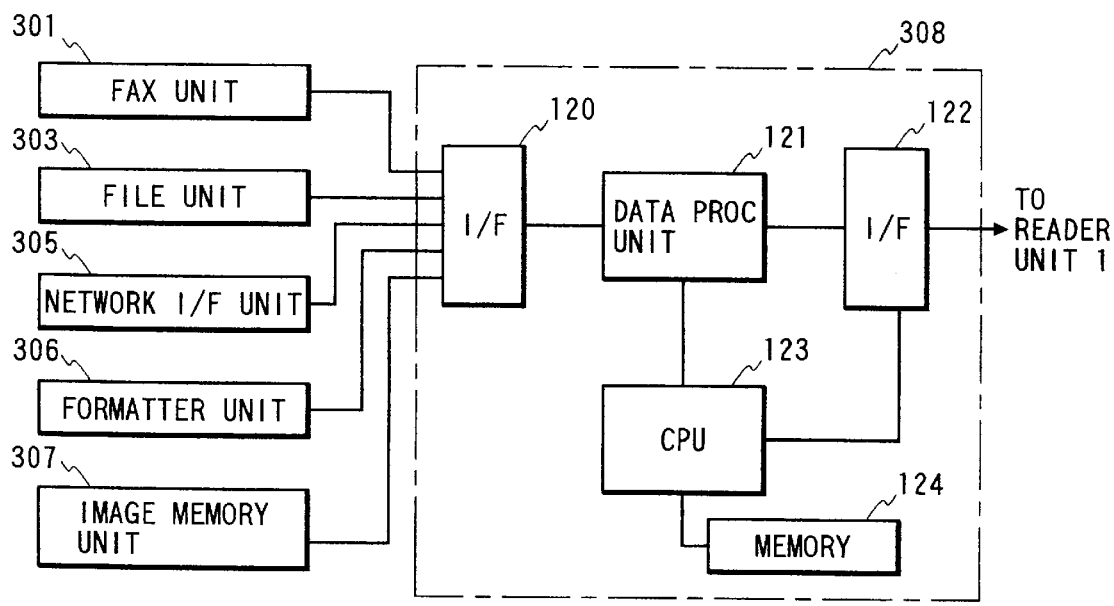
FIG. 4 is a block diagram showing a construction of a core unit 308.

FIG. 4 is a block diagram showing the core unit 308. The image data from the reader unit 1 is transferred to a data process unit 121 via an interface 122, and also the control command from the reader unit 1 is transferred to a CPU 123 via the interface 122. The data process unit 121 performs an image process such as an image rotation process, a zoom process or the like. The image data transferred from the reader unit 1 to the data process unit 121 is then transferred to the facsimile unit 301, the file unit 303 and the network interface unit 305 via an interface 120, in accordance with the control command transferred from the reader unit 1. The code data representative of the image which is input via the network interface unit 305 is transferred to the data process unit 121, and then transferred to the formatter unit 306 to be developed to the image data. This image data is transferred to the data process unit 121, and then transferred to the facsimile unit 301 and the printer unit 2. The image data from the facsimile unit 301 is transferred to the data process unit 121, and then transferred to the printer unit 2, the file unit 303 and the network interface unit 305. Further, the image data from the file unit 303 is transferred to the data process unit 121, and then transferred to the printer unit 2, the facsimile unit 301 and the network interface unit 305. The CPU 123 controls such operations as mentioned above in accordance with the control program stored in a memory 124 and the control command transferred from the reader unit 1. It should be noted that the memory 124 is used as a working area of the CPU 123. As above, it can be performed mainly by the core unit 308 the process which is composed of various functions as to an image read, an image print, an image transmit, an image reception, an image storage, a data input into computer, a data output from computer and the like.

Figure 5:
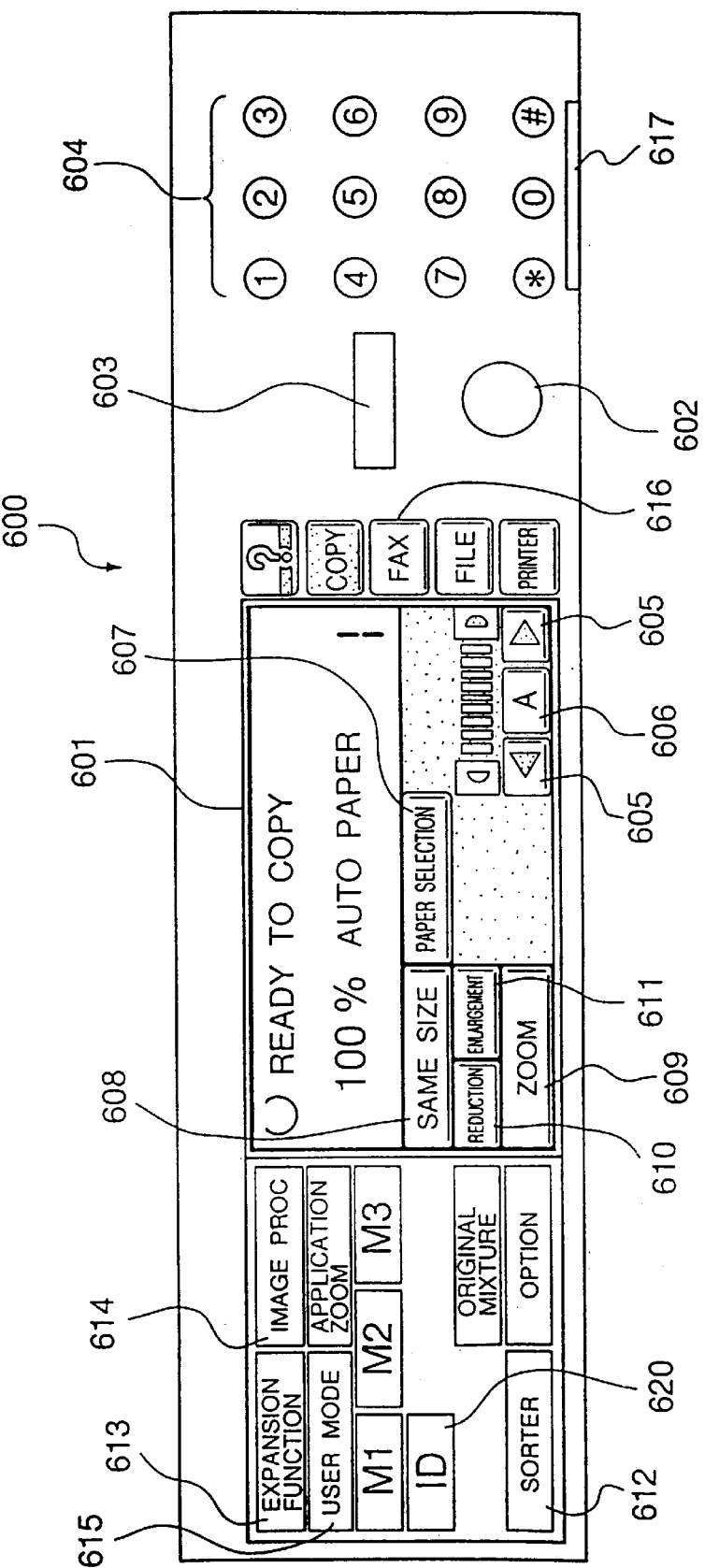
FIG. 5 is a view showing an operation display panel included in a console unit 115.

FIG. 5 is a view showing an operation/display panel 600 included in the console unit 115 of the reader unit 1. As shown in FIG. 5, various keys explained later and a display section 601 composed of a liquid crystal display and the like are provided on an operation surface of the operation/display panel 600. The display section 601 displays information relating to a state of apparatus, the number of papers to be copied (the number of copies), a magnification, a paper (sheet) selection and other various operations. A touch-panel system is applied to the display section 601, whereby various modes can be displayed and selected by depressing the various keys.

Reference numeral 602 denotes a copy start key which is depressed to start a copy operation. Reference numeral 603 denotes a clear/stop key which has a function of clear key when depressed during a stand-by state, and has a function of stop key when depressed during a copy record operation. The clear/stop key 603 is depressed when releasing the set number of copies. Reference numeral 604 denotes a ten key which is depressed when setting the number of copies. Reference numeral 605 denotes copy density keys which are depressed when manually adjusting a copy density. Reference numeral 606 denotes an automatic density adjustment (AE) key which is depressed when automatically adjusting the copy density according to a density of original or when changing an AE mode to a manual density adjustment mode.

Reference numeral 607 denotes a cassette selection key which is depressed when selecting one of the plurality of cassettes 204, 205 and the like. In a case where the original is placed on the original feeder 4, an automatic paper selection (APS) mode can be selected by means of the cassette selection key 607. In the APS mode, the cassette of which recording paper size accords to a size of the image to be output is automatically selected.

Reference numeral 608 denotes a same-size key which is depressed when performing the copy operation of which size is the same as an image size of the original. Reference numeral 609 denotes a zoom key which is depressed when designating an arbitrary magnification within a range of 64% to 142%. Reference numerals 610 and 611 denote fixed-size zoom keys which are depressed when designating fixed-size reduction and enlargement operation.

Reference numeral 612 denotes selection keys for selecting operation modes of the paper (sheet) post-process unit 5. That is, the selection key 612 can select or release one of three paper discharge modes (staple mode, sort mode and group mode). Further, in a case where a stapler capable of stapling the papers after recording is connected to the paper (sheet) post-process unit 5, the selection key 612 can select or release one of the three modes, i.e., staple mode, sort mode and recorded-paper folding (sectional Z and V shapes) mode.

Reference numerals 613, 614 and 615 denote keys for setting various processes, e.g., a two-face mode process, a binder-margin set process, a photograph mode process, a multiple process, a page continuous copy process, a two-in-one (2-in-1) mode process and the like. Reference numeral 616 denotes selection keys for selecting operation modes. Reference numeral 617 denotes a card reader for reading information recorded on an ID card. Further, reference numeral 620 denotes an ID input key. When the ID input key 620 is depressed, the console unit 115 comes to be in an ID input waiting mode. An ID code is input from the ten key 604 when the console unit 115 is in an ID input waiting state, and then the ID input key 620 is again depressed after the input operation terminates, whereby the ID code is established.

Figure 6:
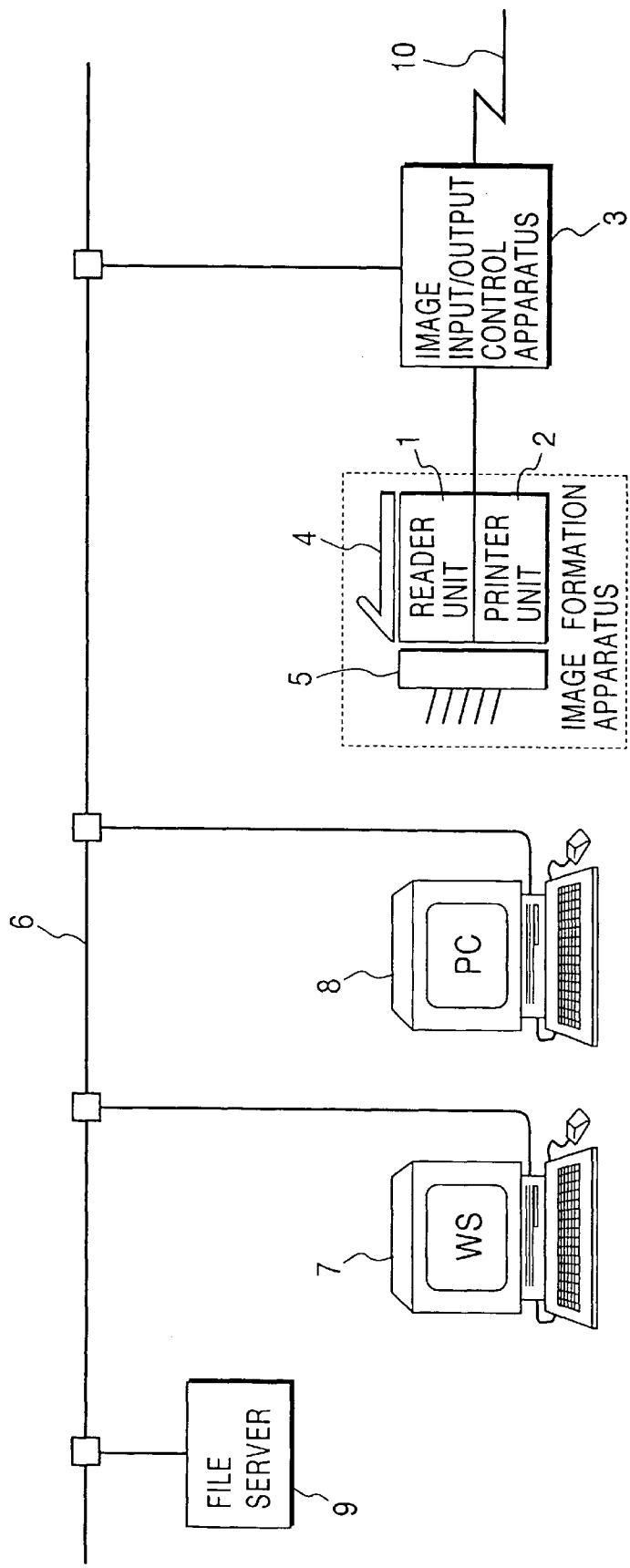
FIG. 6 is a view showing a network construction according to the first embodiment.

FIG. 6 is a view showing a network construction of an image formation system according to the first embodiment.

As explained in FIG. 1, the image formation apparatus is composed of the reader unit 1 for reading the original image, the printer unit 2 for outputting the input image data, the image input/output control unit 3 having the network control function, the original feeder 4 for automatically feeding the original to be read by the reader unit 1, and the paper (sheet) post-process unit 5 for holding the papers discharged from the printer unit 2 into one of the plurality of bins.

The LAN 6 is a network which connects a plurality of information devices or apparatuses and allows data exchanges between the arbitrary devices or apparatuses. A work station (WS) 7 and a personal computer (PC) 8 which form, correct and display the document are connected to the LAN 6 for exchanging the data to/from an external device or apparatus. A file server 9 is a large-capacity memory apparatus which is accessible from the image input/output control unit 3, the WS 7, the PC 8 and the like via the LAN 6. A telephone line 10 is connected to the image input/output control unit 3 to be used for transmitting and receiving facsimile data. Further, an arbitrary device or apparatus can be connected to the reader unit 1, the printer unit 2 or the LAN 6 to access a distant network.

The first embodiment of the present invention can be realized in the network circumstances shown in FIG. 6.

A user forms the document by using the WS 7 or the PC 8. When such a document formation terminates and the obtained document is output onto the paper, the user inputs print procedures (designation of image formation apparatus, designation of the number of outputs, designation of post-process method, designation of immediate print and the like) and then generates a print command.

When there is a print instruction via the LAN 6, the image formation apparatus once stores the data into the image memory unit 307, and thereafter causes the print function to act with making reference to various print procedure information in the print command. Further, in a case where the image formation apparatus is in a copy job process, an interruption process is possible by the user's instruction.

Figure 7:
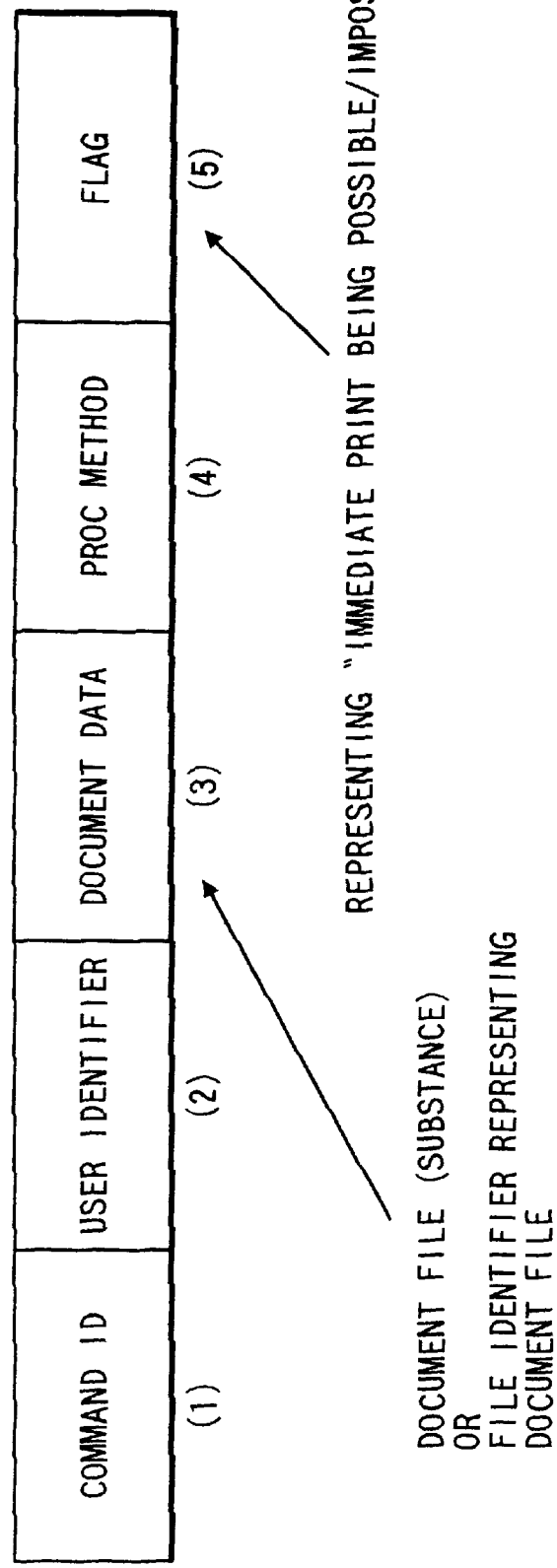
FIG. 7 is a view showing a print command format.

FIG. 7 shows a command format for instructing the print operation from the WS 7 or PC 8 in FIG. 6 to the image formation apparatus. The command is composed of (1) an ID representing a command function, (2) a user ID representing the user who generated the command, (3) a document file to be printed, or a file identifier in a case where the document file is stored in the file server 9 or the optomagnetic disk set on the optomagnetic disk drive unit 304, (4) a process method for storing information as to designation of the number of papers/copies, designation of post-process method, document data holding form (image data developed to code data/bit map) and the like in case of no immediate print, and (5) a flag representing whether immediate print is possible or impossible.

Figure 8:
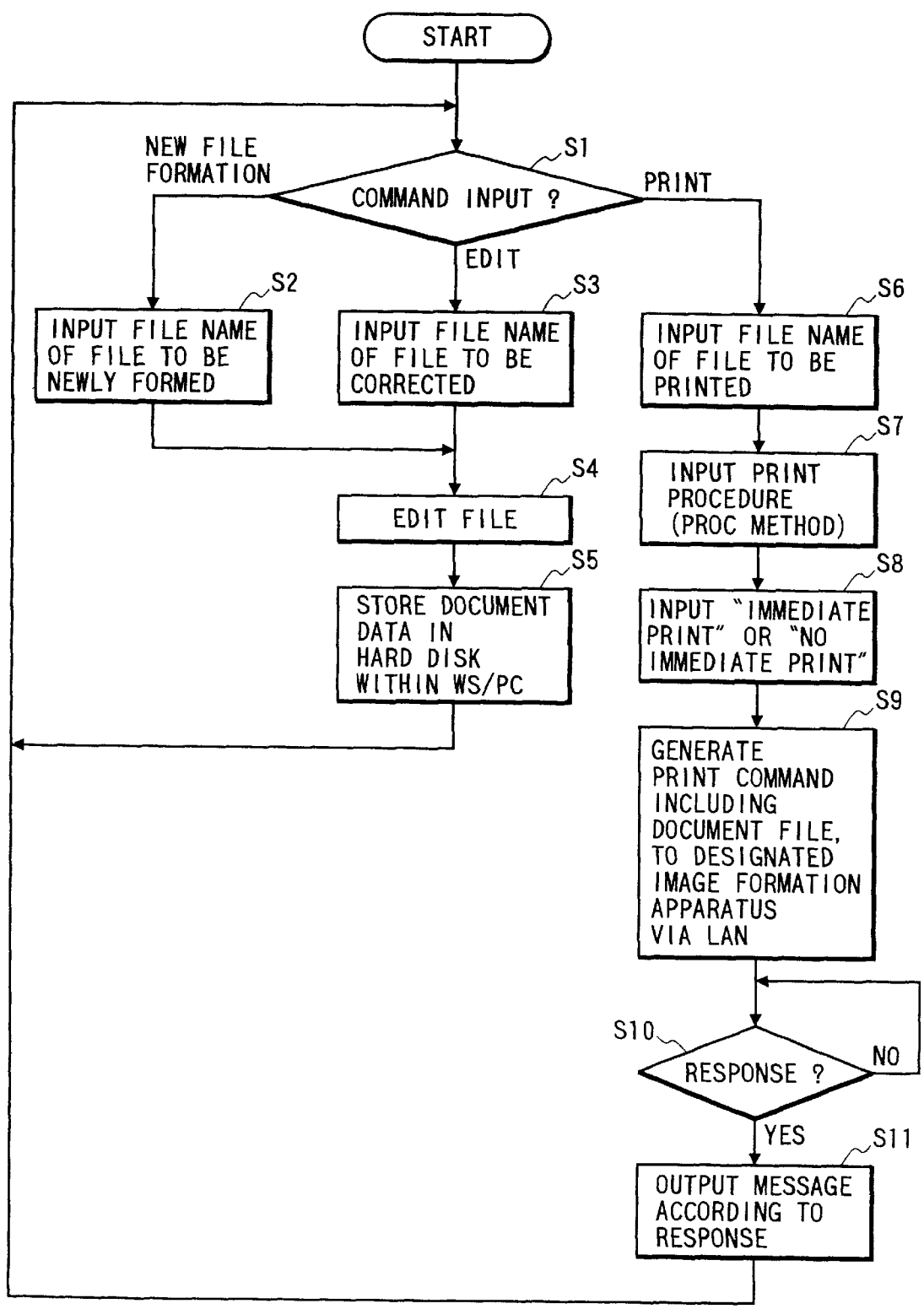
FIGS. 8 and 9 are flow charts showing a process for instructing to form, edit and print a document file.

FIG. 8 is a flow chart showing a process in a case where the document data formed and edited by the WS 7 or PC 8 in FIG. 6 is stored in a hard disk which is managed by the WS 7 or PC 8. That is, this flow chart shows the process which is performed based on a program code installed in the WS 7 or PC 8.

Immediately after a power source is turned on, the flow waits for a command input from the user (step S1). In this case, if it is instructed to form a new file, a display is performed for urging the user to input a file name, so that the user inputs the file name (step S2). If it is instructed to edit the file, the display is performed for urging the user to input (or select) the file name of the file to be edited, so that the user inputs (or selects) the file name (step S3). Then, after inputting (or selecting) the file name, the flow enters into an edit mode to edit the document of the file in accordance with the user's instruction (step S4). When the edit process terminates, the document data is stored in a memory such as the hard disk or the like which is managed by the WS 7 or PC 8, in accordance with the user's instruction (step S5). If the user instructs to print out the document, the display is first performed for urging the user to input (or select) the document file to be printed out, so that the user inputs (or selects) the file name (step S6). Then, the display is performed for urging the user to input the process methods such as the designation of the image formation apparatus which is caused to print out the document file, the designation of the number of papers/copies, the designation of the post-process method, the holding form of the document data and the like, so that the user inputs the respective process methods (step S7). Thereafter, the display is performed for urging the user to input whether or not the immediate print is to be performed, so that the user inputs it (step S8). The print command (in FIG. 7) including the document file (substance) of which file name is input in the step S6 and the user ID is generated to the image formation apparatus which was designated in the step S7 (step S9), and then the flow waits for a response from this image formation apparatus (step S10). If there is the response, a message according to the response is output to be displayed (step S11). As this message, "print request of (file name) was accepted", "print request of (file name) can not be accepted due to lack of memory vacancy", "print of (file name) terminated" or the like is displayed. It should be noted that a further input is possible for this message.

Figure 9:
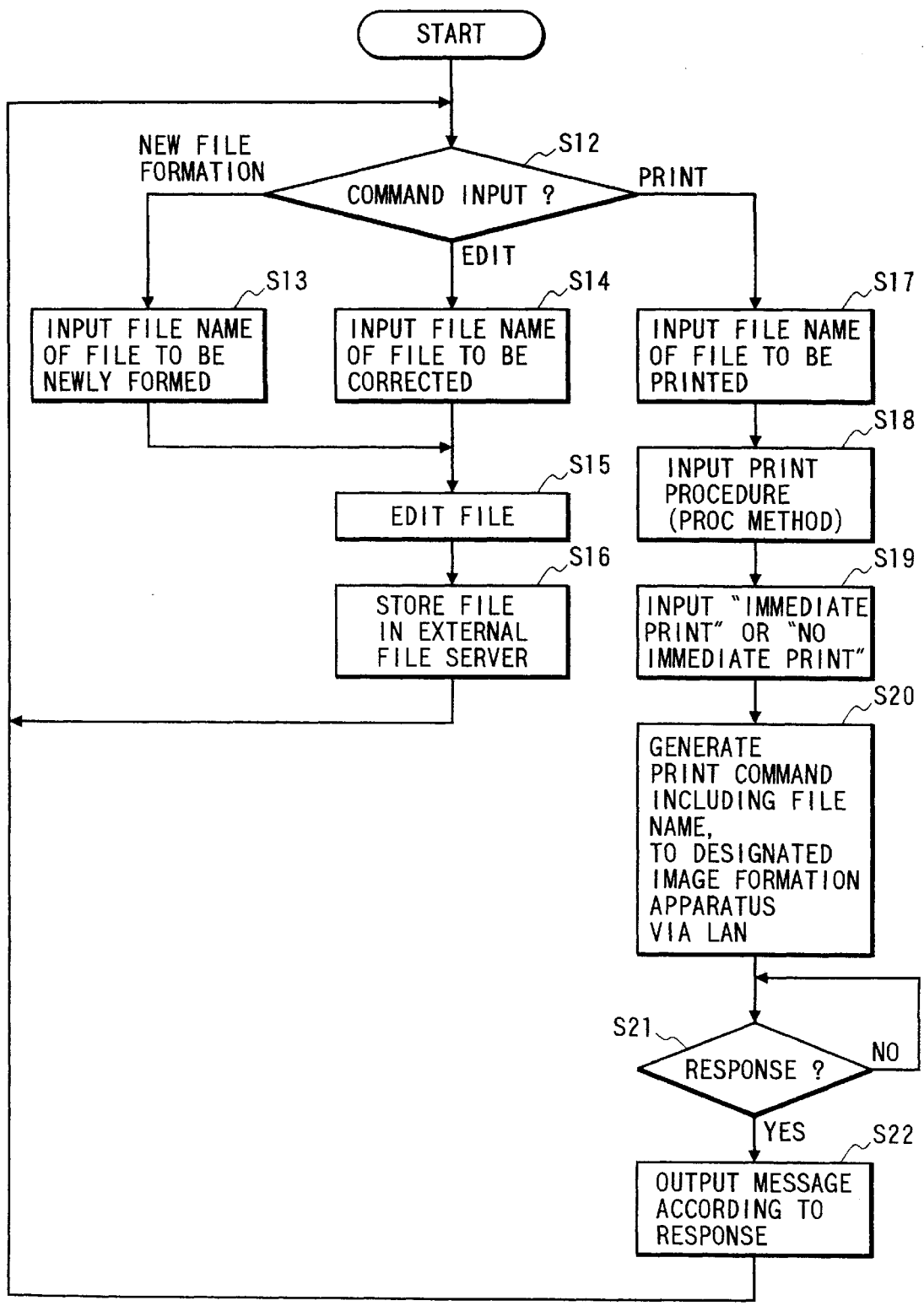

FIG. 9 is a flow chart showing a process in a case where the document data formed and edited by the WS 7 or PC 8 in FIG. 6 is stored in an external file server 9 on the LAN 6. That is, this flow chart shows the process which is performed based on the program code installed in the WS 7 or PC 8.

Processes in steps S12 to S15 are performed in the same manner as in the above-explained steps S1 to S4. In a step S16, the file server 9 is designated to store the document file, whereby the document file is transferred and stored in the designated file server 9 together with the file name.

Processes in steps S17 to S19 are performed in the same manner as in the above-explained steps S6 to S8. In a step S20, the file name (not including the substance of the document file) input in the step S17 and the print command including the user ID are generated to the image formation apparatus which was designated in the step S18. The information representing the file name in the print command also includes the information representing that the document file of such the file name is being stored in the file server 9.

In steps S21 and S22, the message is output according to the response from the image formation apparatus in the same manner as in the above-explained steps S10 and S11. It should be noted that a further input is possible for this message.

It will be then explained the flow of process at a side of the image formation apparatus. The process explained below is controlled by the CPU 123 on the basis of a program code stored in the memory 124. It should be noted that the respective flows of processes are performed in parallel under the management of a multi-task monitor.

Figure 10:
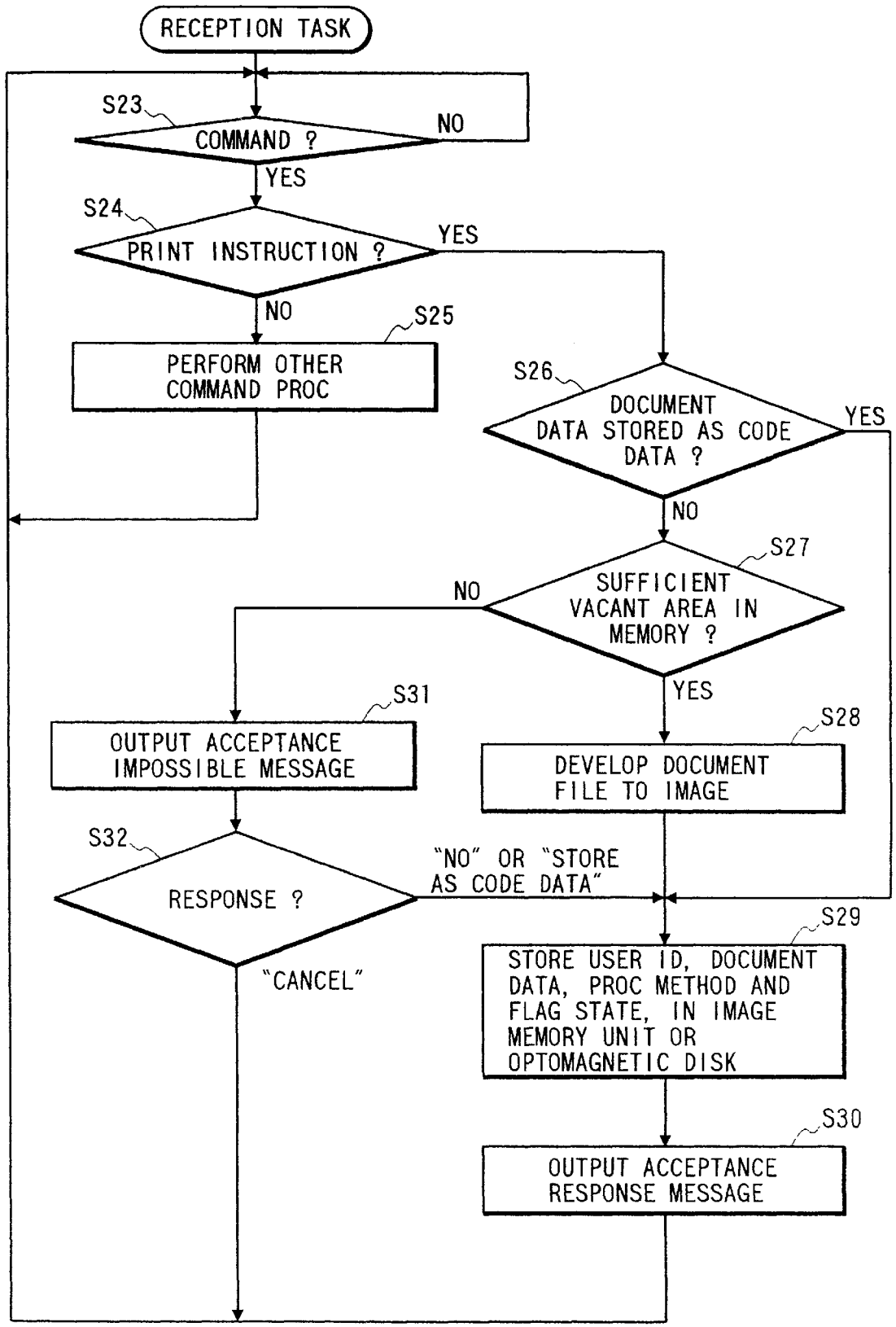
FIG. 10 is a flow chart showing a process of a reception task.

FIG. 10 is a flow chart showing a process performed by a reception task.

In an idle state, the flow waits for the command from the LAN 6 (step S23). Then, if the print command is received (step S24), it is judged from the process contents included in the command whether or not the holding form of the document data is designated to be made by code data (step S26). If the holding form of the document data is not designated to be made by the code data but is designated to be made by image data developed to the bit map image, it is judged whether or not there is enough vacancy in the image memory unit 307 or the optomagnetic disk (step S27). If there is enough vacancy, the code data of the document file to be printed is developed to the bit map image by the formation unit 306 (step S28), and other user ID of the document data, the process method, the flag state representing whether or not the immediate print is to be performed are stored in the image memory unit 307 or the optomagnetic disk, with correlating them with others (step S29). In this case, it has previously been determined which of the image memory unit 307 or the optomagnetic disk is to store these data. Then, it is output to the terminal (WS 7 or PC 8) on the LAN 6 which requested the print an acceptance response message representing that the print acceptance could normally be performed (step S30). On the other hand, if there is no enough vacancy on the image memory unit 307 or the optomagnetic disk, it is output to the terminal on the LAN 6 which requested the print an acceptance impossible message representing that the print can not be accepted due to lack of memory capacity (step S31). Then, the flow waits for a response to this message which is transmitted from the terminal on the LAN 6 (step S32). If there is no response or there is the response for requesting to change the operation to hold the data in the form of code data, the document file is maintained to be in the form of code data, and the user ID, the process method and the flag state are stored in the image memory unit 307 or the optomagnetic disk, with correlating them with others (the step S29). On the other hand, if there is the response for requesting a cancel, the flow returns to the step S23. If there is no print command in the step S24, other command process is performed (step S25), and then the flow returns to the step S23.

Figure 11B:
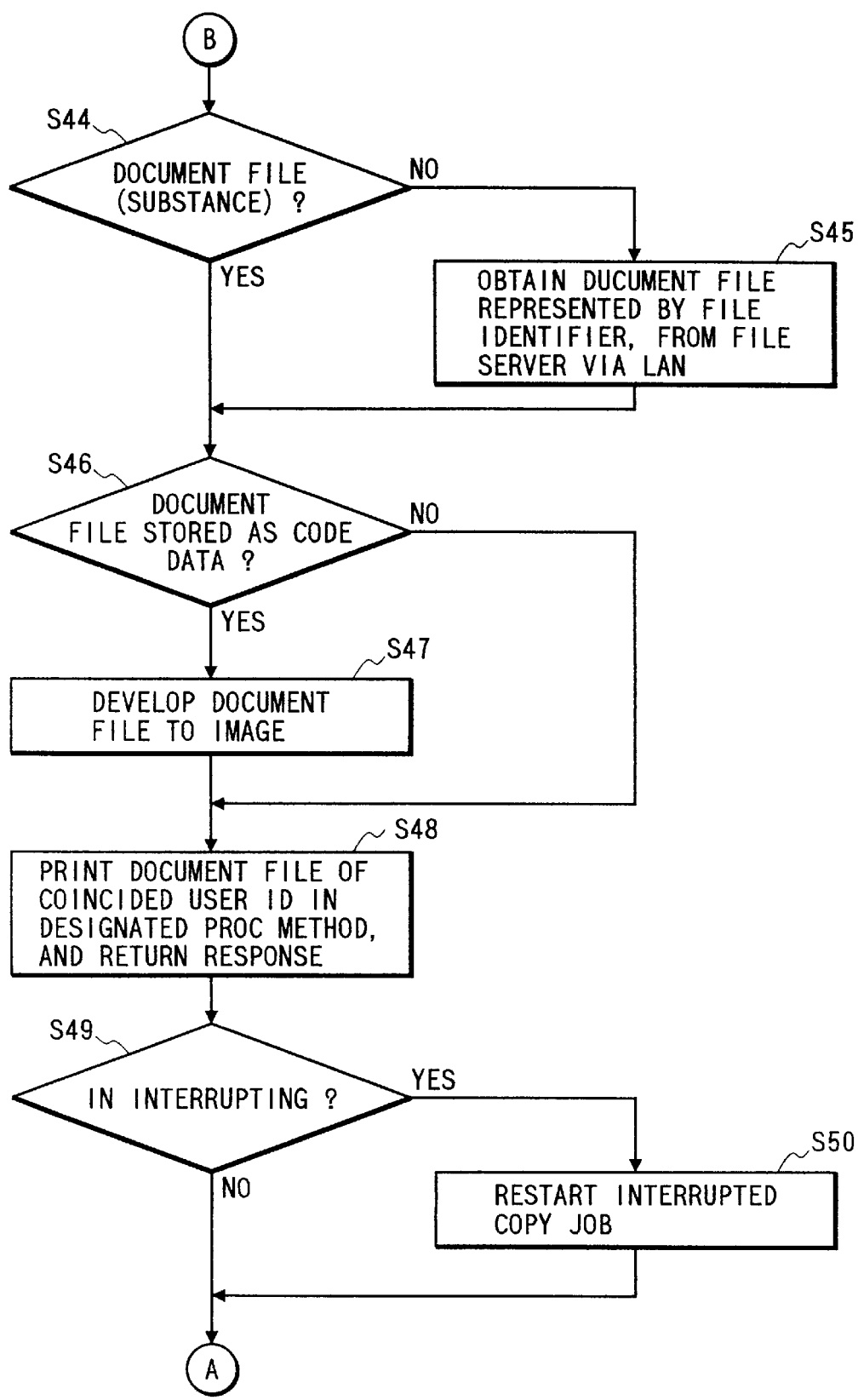
FIG. 11 which composed of FIGS. 11A and 11B is a flow chart showing a process of a print task.

FIGS. 11A and 11B are a flow chart showing a process performed by a print task.

In the idle state, it is always checked whether or not there is the data to be printed in the image memory unit 307 or the optomagnetic disk (step S33). If there is the data to be printed, the state of the flag representing whether the immediate print is possible or impossible is checked (step S34). Then, if the immediate print is possible, the print starts in the designated process method (step S37). However, in this case, if a copy job is already being executed (step S35), the flow waits for the process until the copy job terminates (step S36).

On the other hand, if the immediate print is impossible, it is first confirmed whether or not the copy job is being executed (step S38). In this case, if the copy job is being executed and there is an interruption instruction (step S39), the flow enters into an interruption mode (step S40). That is, the copy job which is being executed is interrupted and instead a print job starts, then the flow waits for the ID card to be input into the card reader 617 shown in FIG. 5 (step S41). If the ID card is input, it is checked whether or not the user ID recorded on the ID card coincides with the user ID stored with correlating it with the document data to be printed (step S42). If not coincided, an alarm display is performed on the operation display panel (step S43).

If the user IDs coincide with each other, it is judged whether or not the substance of the corresponding document file has been stored in the image memory unit 307 or the optomagnetic disk (step S44). If not stored, the substance of such the document file is stored in the image memory unit 307 or the optomagnetic disk, by designating the file name of the document file to be printed via the LAN 6 (step S45).

Then, it is judged whether or not the document data to be printed has been stored in the image memory unit 307 or the optomagnetic disk in the form of (or in the state of) code data (step S46). If the code data, the document file is transferred to the formatter unit 306 to develop it to the bit map image (step S47). Thereafter, the print of document data is performed in the designated process method. If the print terminates normally, a normal end response is returned to the terminal on the LAN 6 which requested the print (step S48). After the print terminates, it is judged whether or not the process is in the interruption (step S49). If in the interruption, the interrupted copy job restarts (step S50).

In the above explanation, the user ID is input by means of the ID card. However, the present invention is not limited to such an operation. That is, the user ID may be input by means of a ten key or the like on the console unit 115.

According to the first embodiment, the print can start at a timing desired by the user.

Further, if the document file has previously been developed to a non-compressed bit map image, a waiting time until the print starts can be shortened. In this case, if the vacant capacity of the memory is small, the document file is held in the form of code data as it is, whereby it can be prevented that the print acceptance becomes impossible due to lack of memory vacant capacity.

Furthermore, in case of performing a stapling process, such that the stapling process can start when the user stands in front of the image formation apparatus, whereby it can be prevented that the output papers are erroneously stapled together with other output papers.

Furthermore, the jobs for the plurality of the document files have previously been spooled, whereby these document files can be printed out at one time, in response to the input of the user ID.

Second Embodiment

In the above-mentioned first embodiment, the user ID has previously been determined and then the print starts in response to the input of this user ID. However, in the second embodiment, a unique ID is generated at random and the generated ID is notified to a user who requests a print, and then the print starts in response to an input of this ID.

Figure 12:
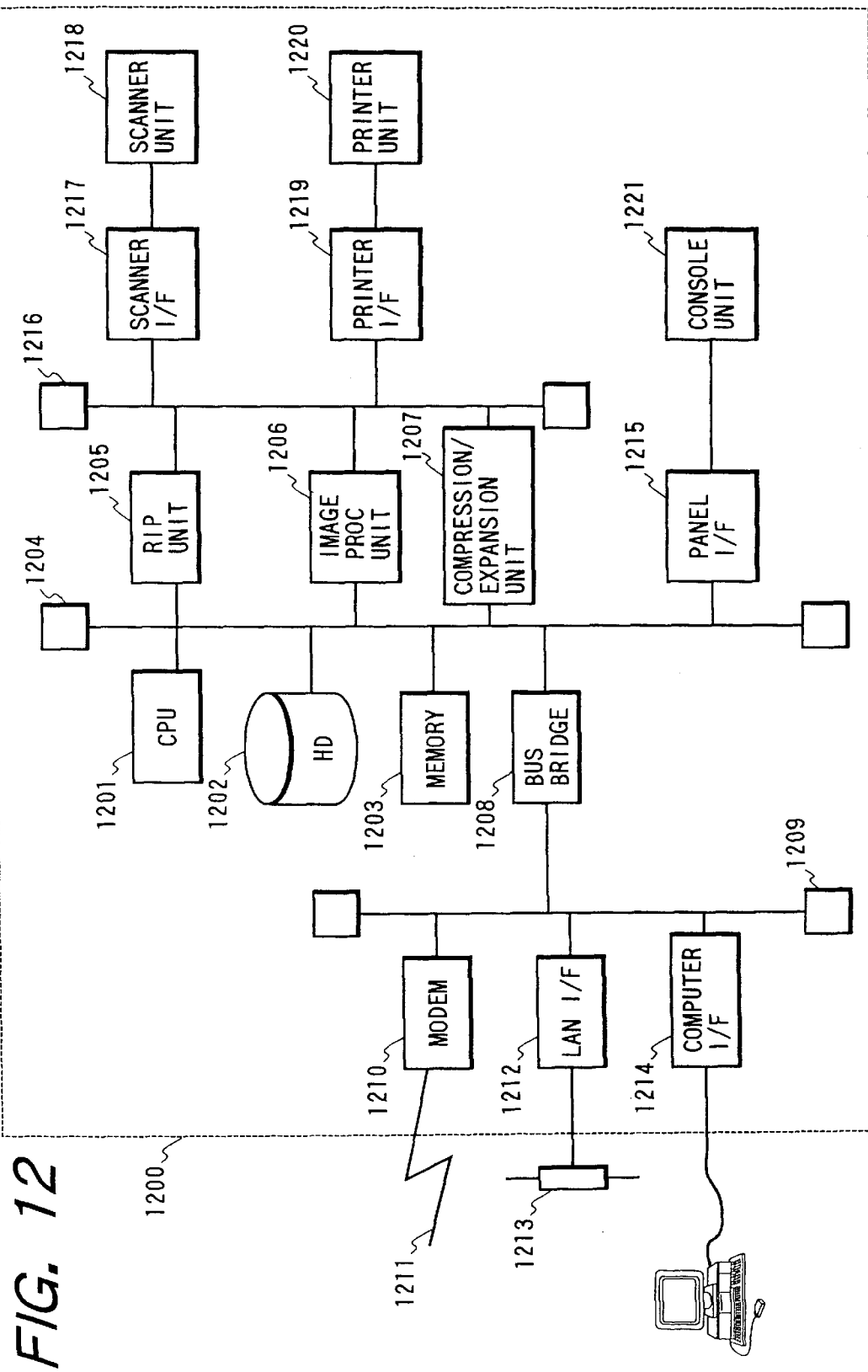
FIG. 12 is a block diagram showing a schematic construction of a copy machine according to a second embodiment.

FIG. 12 is a block diagram showing a schematic construction of a copy machine according to the second embodiment of the present invention.

A CPU 1201 is a microprocessor which controls a copy machine 1200 as a whole and operates on the basis of a real-time operation system (OS).

A large-capacity hard disk (HD) 1202 stores therein a plurality of applications to be used when the CPU 1201 operates, and is controlled or managed by the CPU 1202.

A memory 1203 is a work memory to be used when the CPU 1201 operates and is accessible at a high speed from the CPU 1201. The memory 1203 stores a program to be used when the CPU 1201 controls an operation of the copy machine 1200, so that the CPU 1201 controls each unit of the copy machine 1200 by reading the stored program.

A high-speed CPU bus 1204 is a bus for connecting the CPU 1201, the HD 1202, the memory 1203 and each functional unit (explained later) of the copy machine 1200. That is, the bus 1204 transfers data processed by the CPU 1201 to each functional unit, and performs a high-speed data transfer (DMA transfer) among the respective functional units.

A raster image processor (RIP) unit 1205 is the functional unit which receives an image formation command input from an external interface connected to a computer (explained later) and then converts the command into a bit map image in accordance with contents of the command. In this case, the image formation command is input from the high-speed CPU bus 1204 and is to output an image to a high-speed image bus 1216 (explained later).

An image process unit 1206 is the functional unit which performs a filtering process, e.g., a smoothing process, an edge process or the like, of the image input from the high-speed image bus 1216 in accordance with a process instruction from the CPU 1201.

Further, the image process unit 1206 has a character recognition (OCR) function for the image input from the high-speed image bus 1216 and an image separation function for separating an image portion from a character portion in the image.

A compression/expansion unit 1207 compresses the image input from the high-speed image bus 1216 in a known compression method, e.g., MH, MR, MMR, JPEG or the like, and transmits the compressed data to the high-speed CPU bus 1204 or again to the high-speed image bus 1216. Conversely, the compression/expansion unit 1207 expands the compressed data input from the bus 1204 or 1216 in a compression method according to this functional unit, and then transmits the expanded data to the high-speed image bus 1216.

A bus bridge 1208 is a bus bridge controller which connects the high-speed CPU bus 1204 to a low-speed CPU bus 1209 (explained later) so as to adjust a difference in processing speed between the buses. According to the bus bridge 1208, the CPU 1201 which operates at a high speed can access the functional unit which is connected to the low-speed CPU bus 1209 and thus operates at a low speed.

The low-speed CPU bus 1209 is a bus of which transfer speed is lower than that of the high-speed CPU bus 1204 and which connects the functional unit of which process speed is relatively low.

A modem 1210 is the functional unit positioned between a public line 1211 and the low-speed CPU bus 1209. The modem 1210 has a function for modulating digital data from the low-speed CPU bus 1209 such that the digital data can be transmitted to the public line 1211, and has a function for converting modulated data from the public line 1211 into the digital data which can be processed within the copy machine 1200.

A local area network (LAN) interface 1212 is the functional unit which connects the copy machine 1200 to a LAN 1213 which is a local network, and is to transmit/receive the data to/from the local network.

A computer interface 1214 is the functional unit which connects the copy machine 1200 to the computer. That is, via the computer interface 1214, a control command is transmitted from the computer to the copy machine 1200 and a status of the copy machine 1200 is returned to the computer.

A panel interface 1215 is the functional unit which manages various control signals to a console unit 1221

(explained later). That is, the panel interface 1215 transmits a signal of an input switch such as a key or the like provided on the console unit 1221 to the CPU 1201, and performs a resolution conversion for displaying the image data formed by the RIP unit 1205, the image process unit 1206 and the compression/expansion unit 1207 on a liquid crystal display unit provided on the console unit 1221.

The high-speed image bus 1216 connects image input/output buses in the various image formation units (RIP unit 1205, image process unit 1206, compression/expansion unit 1207), and a scanner interface 1217 and a printer interface 1219 (both explained later) with others. The bus 1216 is not controlled by the CPU 1201 but is controlled by a bus controller to transfer the data.

A scanner unit 1218 is a visible image reading apparatus which has an automatic original feeder. The scanner unit 1218 has a three-line (RGB) CCD color sensor, or a one-line black/white CCD line sensor. The image data read by the scanner unit 1218 is transferred to the high-speed image bus 1216 by the scanner interface 1217.

In the scanner interface 1217, the image data read by the scanner unit 1218 is optimally digitized on the basis of the contents of the following processes. Further, the scanner interface 1217 has a function for performing a serial/parallel conversion according to a bus width (data width) of the high-speed image bus 1216 and a function for converting the read RGB three-primary color data into CMYBK data.

A printer unit 1220 prints the image data obtained from the printer interface 1219 (explained later), on a recording paper as visible image data.

The printer interface 1219 transfers the image data transmitted from the high-speed image bus 1216 to a printer unit. The printer interface 1219 has a bus-width conversion function for converting the bus width of the high-speed image bus 1216 into a bus width according to a gradation of the printer unit 1220 from which the data output is to be performed, and a function for adjusting a difference between a print speed of the printer unit 1220 and a transfer speed of image data by the high-speed image bus 1216.

The console unit 1221 has the liquid crystal display unit, a touch-panel input device attached on the display unit and a plurality of hard keys. The signal input by a touch panel or the hard key is transmitted to the CPU 1201 via the panel interface 1215, and the liquid crystal display unit displays the image data transmitted from the panel interface 1215. Further, the liquid crystal display unit displays the functions in the operation of the copy machine 1200, the image data and the like.

Figure 13:
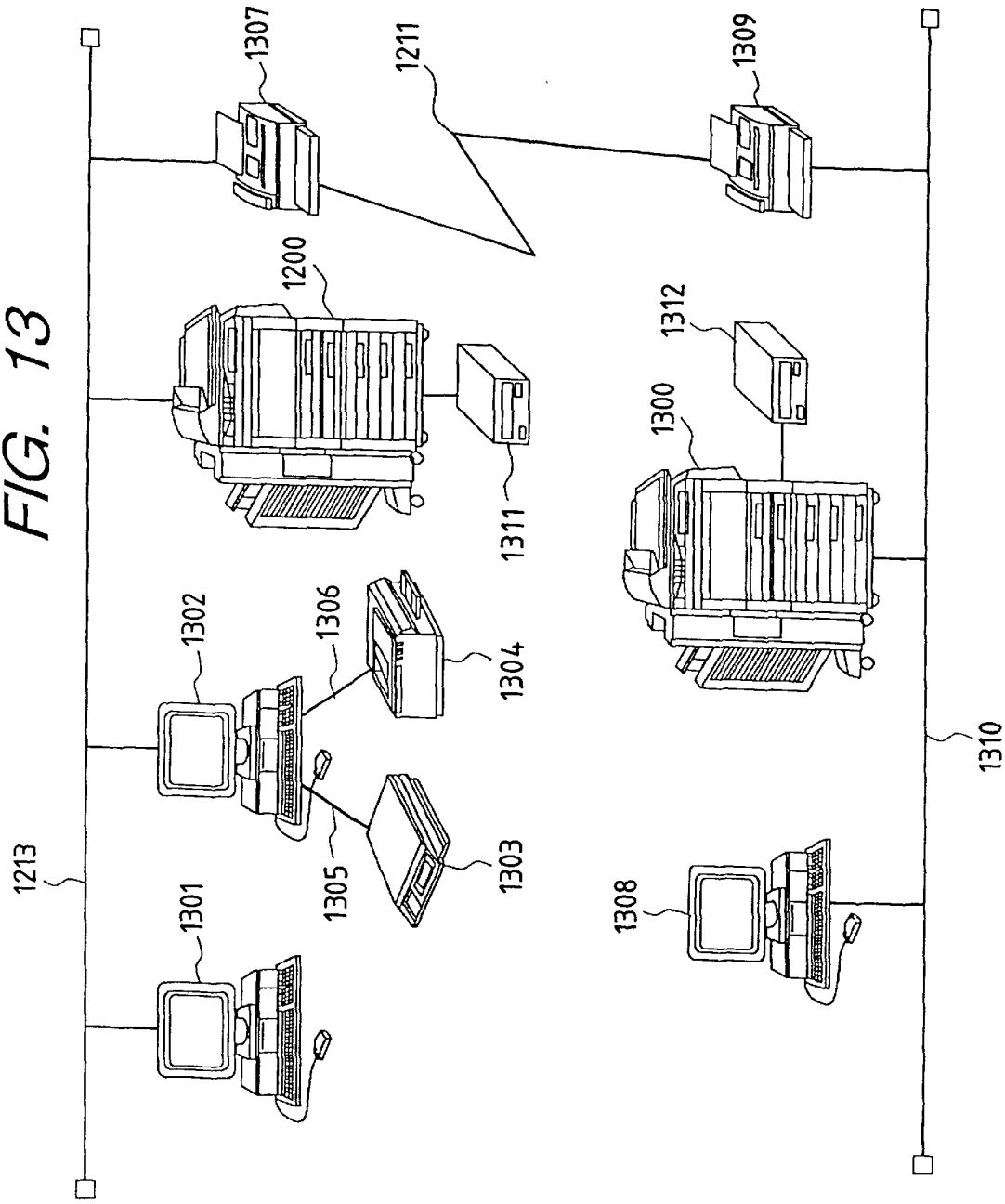
FIG. 13 is a view showing a connection example in a case where a copy machine 1200 is connected to a local area network (LAN)

With reference to FIG. 13, it will be explained hereinafter an example of the construction in case of connecting the copy machine 1200 to the LAN 1213 in FIG. 12.

As shown in FIG. 12, the copy machine 1200 is the image formation apparatus which has the large-size liquid crystal touch panel and is connected to the LAN 1213. Further, the copy machine 1200 has the scanner function and the printer function. Furthermore, the copy machine 1200 itself has the copy function, and has a function as an electronic filing apparatus by connecting an optomagnetic disk unit 1311 to the copy machine 1200. Moreover, the copy machine 1200 has the printer function for printing the data transmitted from the computer and the like. Therefore, when a document or the like formed by a personal computer (PC) 1301 or 1302 is received via the LAN 1213 as image formation command data (code data such as PDL code data or the like), the copy machine 1200 develops the received data to bit map image data, and the printer unit 1220 performs the print. Also, a copy machine 1300 at a communication partner which connected via the public line 1211 has the same functions.

A facsimile machine 1307 is an image formation apparatus which has substantially the same construction as that of the copy machine 1200. That is, the facsimile machine 1307 has a large-size liquid crystal touch panel, and is connected to the LAN 1213 and also to the public line 1211. The facsimile machine 1307 itself has a simple copy function and a G3 facsimile function, and also acts as a gate way to a LAN 1310 at the communication partner via the public line 1211. Also, a facsimile machine 1309 at the communication partner has the same functions.

The PC 1301 is ordinarily used by the user, and can form the document and manage an electronic mail to other computers connected to the LAN 1213. Also, a PC 1308 at the communication partner has the same function.

The PC 1302 is substantially the same as the PC 1301. That is, the PC 1302 is connected to the LAN 1213, and is connected with a scanner unit 1303 and a printer unit 1304 respectively via interfaces 1305 and 1306 which are general for a computer and essentially provided in the PC 1302. The scanner unit 1303 is used to incorporate an image read by the scanner unit 1303 onto a document formed by the PC 1302, and the printer unit 1304 is used to print out the document formed by the PC 1302. A system consisting of the PC 1302, the scanner unit 1303 and the printer unit 1304 has a simple copy function for printing out the image read by the scanner unit 1303 via the printer unit 1304 in response to an operation from the PC 1302.

Then, it will be explained hereinafter a process flow in a case where the data formed in the PC 1301 is printed out by the copy machine 1200.

Figure 14:
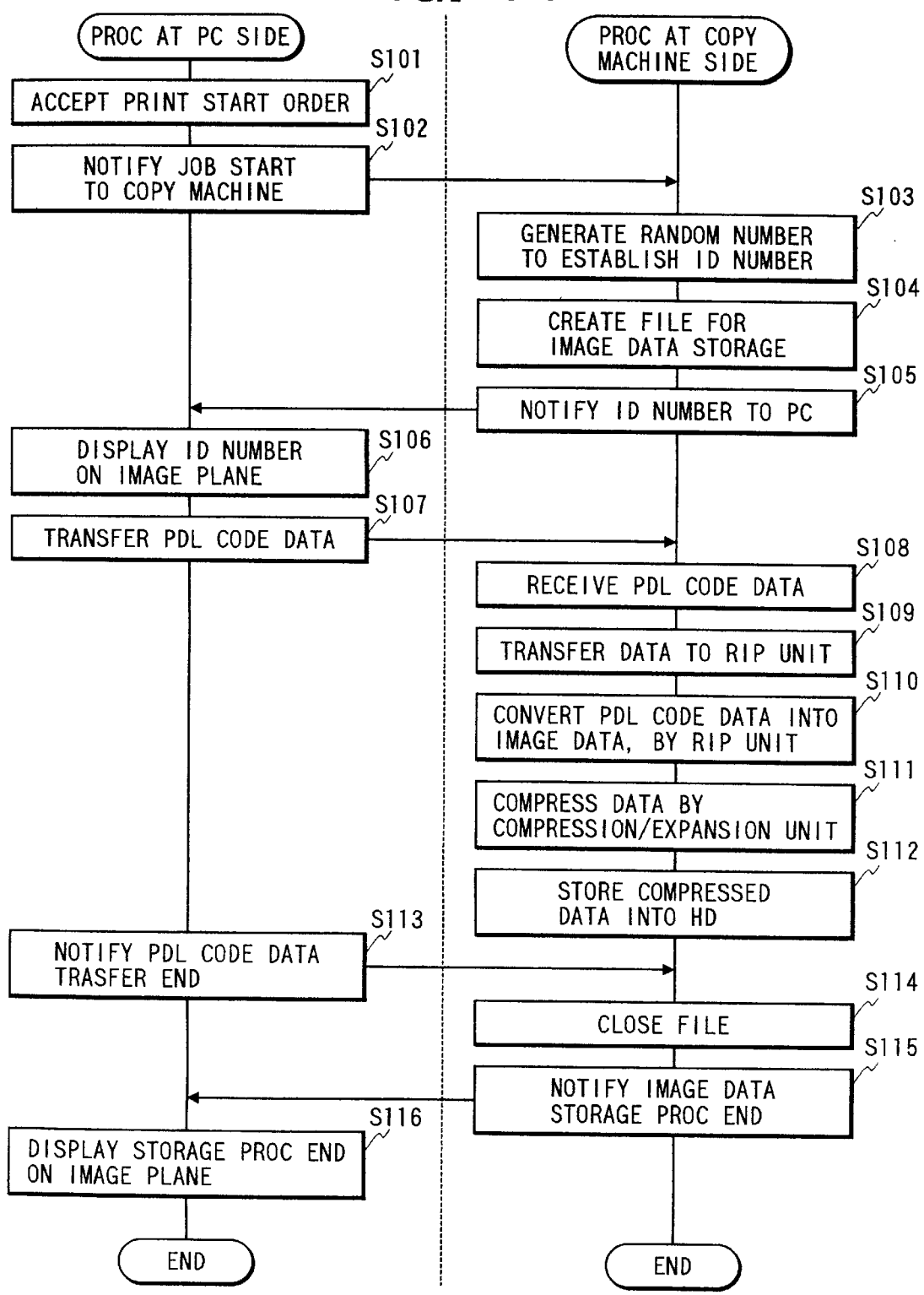
FIG. 14 is a flow chart showing a process in a case where a document formed by a personal computer (PC) 1301 is transferred to the copy machine 1200.

First of all, according to a flow chart shown in FIG. 14, it will be explained a sequence in which the PDL code data transmitted from the PC 1301 is received by the copy machine 1200 and the image data developed by the RIP unit 1205 is stored in the HD 1202.

In a step S101, it is started in response to the print start instruction from the user the transfer process of the document data formed by the user in the PC 1301, from the PC 1301 to the copy machine 1200. In this case, the user instructs to print a secret (or confidential) document.

In a step S102, prior to the transfer of document data, the PC 1301 notifies a job start as to the print of secret document, to the copy machine 1200 via the LAN 1213.

In a step S103, the CPU 1201 renders a unique different ID number to each jog accepted by the copy machine 1200. The ID number may be determined by increasing the number one by one every time the job is accepted. However, in this case, in order to prevent that an other person or a third person prints out the document data without permission, a random number of four figures or so is generated to be used as the ID number.

In a step S104, the CPU 1201 of the copy machine 1200 declares to start the file formation, i.e., performs a create process of the file, as a preparation for storing the image data into the HD 1202. At this time, the above ID number is used as a file name.

In a step S105, the CPU 1201 of the copy machine 1200 notifies, via the LAN 1213, the ID number determined in the step S103 to the PC 1301 which requested the print of secret document.

In a step S106, the PC 1301 displays the notified ID number on an image plane to notify it to the user.

In a step S107, the PC 1301 transfers the formed document as the PDL code data, via the LAN 1213. Then, the copy machine 1200 receives the PDL code data in a step S108.

In a step S109, the CPU 1201 of the copy machine 1200 transfers the PDL code data received from the LAN 1213, to the RIP unit 1205.

In a step S110, the RIP unit 1205 converts the received PDL code data into the image data.

In a step S111, the converted image data is transmitted, in unit of page, from the RIP unit 1205 to the compression/expansion unit 1207 via the high-speed image bus 1216. Then, the transmitted data is converted into the compressed data. In a step S112, the data compressed by the compression/expansion unit 1207 is transmitted to the HD 1202 via the high-speed CPU bus 1204, to be stored with correlating it with the ID number. When the compressed data is stored in the HD 1202, a capacity of the HD 1202 can effectively be utilized because the data has been compressed.

The steps S107 to S112 are repeated until the processes of all of the PDL code data transmitted from the PC 1301 are completed. In this case, it should be noted that the processes of the CPU 1201, the RIP unit 1205, the compression/expansion unit 1207 and the HD 1202 are independently performed in parallel.

In a step S113, the PC 1301 notifies that the transfer of the PDL code data terminates, to the copy machine 1200 via the LAN 1213.

In a step S114, the CPU 1201 confirms that the reception of the PDL code data terminates and all of the PDL code data are converted into the image data to be stored in the HD 1202. After such a confirmation, the CPU 1201 performs a close process of the file.

In a step S115, the copy machine 1200 notifies that the storage of the image data into the HD 1202 terminates, to the PC 1301 via the LAN 1213.

In a step S116, the PC 1301 displays on the image plane that the development/storage process of the PDL data terminates in the copy machine, to notify it to the user.

As explained above, the flow terminates the processes that the PDL code data is received from the PC 1301 and then the image data is stored in the HD 1202 as the file. In this case, it should be noted that the plurality of files can be stored in the HD 1202.

Figure 15:
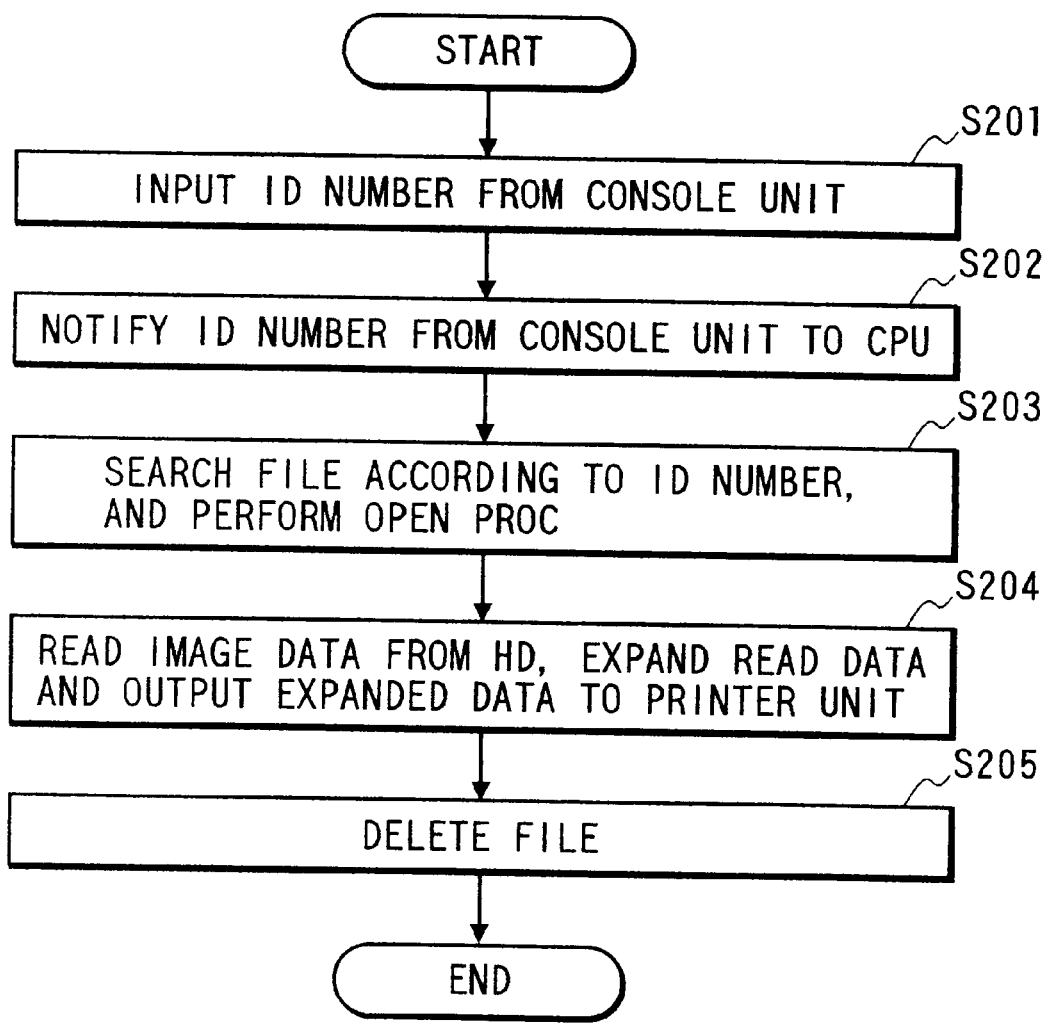
FIG. 15 is a flow chart showing a process in a case where the document stored in a hard disk (HD) 1202 in the copy machine 1200 is printed out.

Then, according to a flow chart shown in FIG. 15, it will be explained hereinafter a sequence in which the image data stored in the hard disk in the above manner is printed out by the user's operation.

In a step S201, after the storage process of the image data terminates, the user inputs the ID number notified in the step S105, from the console unit 1221 of the copy machine 1200.

In a step S202, the input ID number is notified to the CPU 1201 via the panel interface 1215.

In a step S203, the CPU 1201 searches the file corresponding to the notified ID number, from among the plurality of files stored in the HD 1202, and then opens it.

In a step S204, the image data of the searched file is read out from the HD 1202, in unit of page. The read image data is transferred to the compression/expansion unit 1207 via the high-speed CPU bus 1204 to be expanded. Then, the expanded data is transferred to the printer interface 1219 via the high-speed image bus 1216, and is printed out by the printer unit 1220.

The process in the step S204 is repeated plural times corresponding to the number of pages of the image data stored in the HD 1202 as the file.

In a step S205, it is confirmed that the data was normally printed out, and then the CPU 1201 deletes the corresponding file in the HD 1202.

As above, the flow terminates the sequence for printing out the image data stored in the HD 1202.

As explained above, according to the second embodiment, the image data is not printed out as it is, but is once stored in the hard disk. Therefore, since the image data once stored in the hard disk is then printed out when the user instructs the output start by using the console unit of the copy machine, security protection of output results can be realized.

Further, according to the second embodiment, the ID number to be used for printing out the image data is generated at the copy machine 1200 side and notified to the PC 1301. Therefore, an operator of the PC 1301 who requested the print of the image data can print out the secret document by simple operation without the another person seeing it, by transferring the image data to the copy machine 1200 without setting the ID number and by inputting the notified ID number.

Furthermore, since the unique ID number is generated for each job at the copy machine 1200 side, the same ID number is not generated doubly. Therefore, it can be prevented that the secret document is erroneously printed out by the another person.

Furthermore, even if the document to be printed out is not the secret document, since the image data is printed out by inputting the ID number from the console unit 1221 in the above manner, it can be prevented that the plurality of operators perform the print processes and thus the miscellaneous output papers are mixed with others.

The above effects can be applied not only to the document received via the LAN interface 1212 but also to the document received via the computer interface 1214.

In the above second embodiment, it has been explained that the image data transferred from the computer is printed out by the copy machine 1200. However, the second embodiment is not limited to such the operation, but can be applied to the case where the image data transferred from the computer is printed out by the facsimile machine 1307.

The present invention may be applied to the system which is composed of the plurality of devices (e.g., host computer, interface, reader, printer and the like) or to the single apparatus which is composed of the single device (e.g., copy machine, facsimile machine or the like).

In order to realize the functions in the above embodiments by operating the various devices, a program code of software to be used for realizing the above functions may be supplied to equipments connected to the above various devices or to a computer in the system, so as to operate the computer (e.g., CPU or MPU) in the system or the device in accordance with a stored program. Also, such an operation is included in the category of the present invention.

In this case, since the program code of software itself realizes the functions in the above embodiments, the program code itself and a means, e.g., a storage medium to store such the program code, for supplying the program code to the computer all constitute the present invention.

As the storage medium which can store the program code, e.g., a floppy disk, a hard disk, an optical disk, an optomagnetic disk, a CD-ROM, a magnetic tape, a non-volatile memory card, a ROM and the like can be used.

By applying a detachable means as the storage medium, the present invention can easily be correspond to an apparatus which has a device capable of reading the program code stored in the detachable storage means.

Further, when the computer executes the supplied program code, the functions in the above embodiments can be realized. In addition, when the program code is co-operated with an operating system (OS), other application software or the like in the computer, the functions in the above embodiments can also be realized. In this case, the program code is of course included in the category of the present invention.

Furthermore, after the supplied program code is stored in a memory provided on a function expansion board of computer or a function expansion unit connected to computer, a CPU or the like which is provided in the function expansion board or the function expansion unit can perform whole or part of actual processes on the basis of an instruction from the stored program code, so as to realize the functions in the above embodiments. Such an operation is also included in the category of the present invention.

The present invention has been explained by the preferred embodiments thereof, but the present invention is by no means limited to such the embodiments and is subjected to various further modifications with the cope and spirit of the appended claims.

What is claimed is:

1. An image processing apparatus which comprises connection means for connecting to an external device, input means for inputting image data from the external device via said connection means, and output means for visibly outputting the image data input by said input means, comprising:

reception means for receiving a request for performing a job regarding the image data input by said input means, said job being issued from a user of the external device connected by said connection means;

generation means for generating a unique code for specifying the image data input by said input means in response to a reception of the request by said reception means;

notification means for notifying the user who issued the request received by said reception means of the unique code generated by said generation means;

storage means for storing the image data input by said input means corresponding to the unique code generated by said generation means;

code input means for inputting a code; and control means for controlling said output means such that the image data input by said input means is visibly output by said output means in accordance with the code input by said code input means, which corresponds to the code generated by said generation means.

2. An apparatus according to claim 1, wherein said generation means generates the code for discriminating the image data to be input by said input means.

3. An apparatus according to claim 1, further comprising:

compression means for compressing the image data input by said input means; and expansion means for expanding the image data compressed by said compression means, wherein said storage means stores the image data compressed by said compression means, and said output means outputs the image data expanded by said expansion means.

4. An apparatus according to claim 2, wherein said storage means is capable of storing the plurality of image data, and said output means selects and visibly outputs the image data from said storage means by inputting the code generated by said generation means for each image data input by said input means.

5. An apparatus according to claim 1, wherein the external device connected by said connecting means is one of personal computers connected to LAN capable of connecting a plurality of devices.

6. An apparatus according to claim 5, wherein said notification means notifies the code to a user of the personal computer which inputted the image data by said input means, among the plurality of devices connected to the LAN.

7. An apparatus according to claim 1, wherein said output means outputs visibly the image to a recording media.

8. An image processing apparatus comprising:

reading means for reading on a document an image and outputting image data based on the image;

connection means for connecting to an external device;

image input means for inputting image data represented by code data from the external device through said connection means;

conversion means for converting the image data input by said image input means into a bit map image;

memory means for storing the image data converted by said conversion means, with relating it to a predetermined ID;

determination means for determining whether or not the external device instructs via said connection means to keep the image data input by said input means stored in said memory means, wherein if said determination means determines that it was instructed to keep the image data stored in said memory means, said memory means stores a predetermined ID which is input via said connection means and specifies the image data, associated with the image data;

ID input means for inputting an ID for identifying the image data input by said image input means;

output means for outputting the image data obtained from said reading means or the image data input by said image input means and visualizing an image based on the image data;

source selection means for selecting to visualize the image based on the image data obtained from said reading means or image data input by said image input; and control means for controlling said output means to visualize the image based on the image data stored in said memory means after the ID corresponding to the predetermined ID is input by said ID input means, in case where said selection means selects to visualize the image based on the image data which was input by said image input means and was determined by said determination means that it was instructed to keep the image data in said memory means, and to visualize the image based on the image data stored in said memory means even if the ID is not input by said ID input means in a case where said selection means selects to visualize the image based on the image data input by said image input means and said determination means determines that it was not instructed to keep the image data stored in said memory.

9. An apparatus according to claim 8, wherein said memory means stores an ID corresponding to the image data, and said control means controls said output means to visualize the image based on the image data corresponding to the ID in a case where it is judged that the ID stored in said memory means coincides with the ID input by said ID input means.

10. An apparatus according to claim 8, further comprising selection means for selecting whether the image data input by said image input means is stored in said memory means as code data or stored after converting the image data into the bit map image by said conversion means.

11. An apparatus according to claim 10, wherein, in a case where it is selected by said selection means that the image data is stored as the code data, said control means controls said output means such that the image data is converted into the bit map image by said conversion means and visualize after the ID is input by said ID input means.

12. An apparatus according to claim 10, wherein said selection means performs the selection in accordance with a vacant capacity of said memory means.

13. An apparatus according to claim 8, wherein the external device connected by said connecting means is one of personal computers connected to LAN capable of connecting a plurality of devices.

14. An apparatus according to claim 8, wherein said output means outputs visibly the image data to a recording media.

15. An image processing method comprising:
an input step of inputting image data from an external device;
an output step of visibly outputting the image data input in said input step;
a reception step of receiving a request for performing a job regarding the image data input by said input step, said job being issued from a user of the external device;
a generation step of generating a unique code for specifying the image data input by said input step in response to a reception of the request by said reception satep;
a notification step of notifying the user who issued the request received by said reception step of the unique code generated in said generation step; and
a storage step of storing the image data input in said input step corresponding to the unique code generated by said generation step, in a storage medium;
a code input step of inputting a code; and
a control step of controlling said output step such that the image data input by said input step is visibly output by said output step in accordance with the code input by said code input step, which corresponds to the code generated by said generation step.

16. A method according to claim 15, wherein, in said generation step, the code for discriminating the image data to be input in said input means is generated.

17. A method according to claim 15, further comprising:
a compression step of compressing the image data input in said input step; and
an expansion step of expanding the image data compressed in said compression step,
wherein the image data compressed in said compression step is stored in said storage step, and the image data expanded in said expansion step is output in said output step.

18. A method according to claim 16, wherein the plurality of image data are stored in said storage step, and
in said output step, the image data stored in said storage step is selected and visibly output by inputting the code generated in said generation step for each image data input in said input step.

19. An image processing method comprising:
a reading step of reading an image on a document and outputting image data based on the image;
a connection step of connecting to the external device;
an image input step of inputting image data represented by code data from an external device through said connection step;
a conversion step of converting the image data input in said image input step into a bit map image;
a memory step of storing the image data converted in said conversion step, in a storage medium, with relating it to a predetermined ID;
a determination step of determining whether or not the external device has instructed via said connection step to keep the image data input by said input step stored in said memory step, wherein if said determination step determines that it was instructed to keep the image data stored in said memory step, said memory step stores a predetermined ID which is input via said connection step and specifies the image data, associated with the image data;
an ID input step of inputting an ID for identifying the image data input in said image input step;
a source selection step of selecting to visualize the image based on the image data obtained from said reading step or the image data input by said input step;
an output step of outputting the image data obtained from said reading step or the image data input by said image input step and visualizing an image based on the image data; and
a control step of controlling said output step to visualize the image based on the image data stored in said memory step after the ID corresponding to the predetermined ID is input by said ID input step, in case where said selection step selects to visualize the image based on the image data which was input by said image input step and was determined by said determination step that it was instructed to keep the image data in said memory step, and to visualize the image based on the image data stored in said memory step even if the ID is not input by said ID input step in a case where said selection step selects to visualize the image based on the image data input by said image input step and said determination step determines that it was not instructed to keep the image data stored in said memory.

20. A method according to claim 19, wherein, in said memory step, an ID corresponding to the image data is stored, and
in said output step, the image data corresponding to the ID is output in a case where it is judged that the ID stored in said memory step coincides with the ID input in said ID input step.

21. A method according to claim 19, further comprising a selection step of selecting whether the image data input in said image input step is stored in the storage medium as code data or stored after converting the image data into the bit map image in said conversion step.

22. A method according to claim 21, wherein, in a case where it is selected in said selection step that the image data is stored as the code data, the image data is converted into the bit map image in said conversion step and visualize after the ID is input in said ID input step, in said output step.

23. A method according to claim 21, wherein, in said selection step, the selection is performed in accordance with a vacant capacity of the storage medium.

24. A data processing method used in a system which is connectable to a plurality of terminals, for printing image by a printer of said system, said method comprising:
maintaining data to be printed by the printer;
receiving an instruction to print an image based on the data, the instruction being received from a user via one of said plurality of terminals; and notifying the user of an ID to be subsequently inputted to enable printing of the image associated with the instruction.

25. A method according to claim 24, further comprising:

inputting the notified ID, based on a manual instruction, into the printer which is expected to print the image; and authorizing the printer to print the image, in case where said input ID matches said notified ID.

26. A method of controlling a printing system for printing image by a printer connected to a network having a plurality of users, comprising:

receiving a printing request from one of a plurality of users on the network;

generating unique ID for specifying the received printing request;

notifying the generated ID to a user who submitted the printing request;

associating image data based on the printing request with the notified ID and holding the image data in a memory; and receiving an ID corresponding to the notified ID at the printer, thereby causing the print.

27. A method according to claim 26, wherein code data is received from the user, and the image data rasterizing the code data is held in the memory.

28. A method according to claim 26, further comprising notifying a user if the image based on the held image data being associated with the ID is in a state of being possible to print.

29. An image processing apparatus comprising:

connection means for connecting to an external device;

image input means for inputting image data represented by code data from the external device through said connection means;

conversion means for converting the image data input by said image input means into a bit map image;

memory means for storing the image data input by said image input means corresponding to a predetermined ID for specifying the image data;

entering means for entering a desired ID;

output means for outputting the image data stored by said memory means in response to entering the ID for specifying the image data entered by said entering means as the bit map image;

selecting means for, when storing the image data input by said image input means in said memory means, selecting whether or not storing after converting into the bit map image by said conversion means; and controlling means for controlling at least said conversion means and said output means based on the selecting result by said selecting means, wherein if said selecting means selected to store the image data which was represented by code data and was input by said image input means, without converting into the bit map image, said control means converts the image data into the bit map image by said conversion means and causes said output means to output the image data after entering the ID for specifying the image data by said entering means.

30. An apparatus according to claim 29, wherein said selecting means performs selection based on a capacity of said memory means.

31. An apparatus according to claim 30, wherein if a remaining capacity of said memory means isinsufficient, said selecting means selects to store the image data which was represented by code data and was input by said image input means, without converting into the bit map image.

32. An apparatus according to claim 29, wherein said connection means is connected to a LAN which can connect a plurality of external devices, said image input means inputs the image data from one of the external devices on the LAN.

33. An apparatus according to claim 29, wherein said output means switches, based on instructions from the external device, outputting the image data in response to entering of the ID by said entering means, or outputting the image without entering of the ID.

34. A method of processing data, comprising:

a connection step for connecting to an external device;

an image input step for inputting image data represented by code data from the external device through said connection step;

a conversion step for converting the image data input by said image input step into a bit map image;

a memory step for storing the image data input by said image input step corresponding to a predetermined ID for specifying the image data;

an entering step for entering a desired ID;

an output step for outputting the image data stored by said memory step in response to entering the ID for specifying the image data entered by said entering step as the bit map image;

a selecting step for, when storing the image data input by said image input step in said memory step, selecting whether or not storing after converting into the bit map image by said conversion step; and a controlling step for controlling at least said conversion step and said output step based on the selecting result by said selecting step, wherein if said selecting step selected to store the image data which was represented by code data and was input by said image input step, without converting into the bit map image, said control step converts the image data into the bit map image by said conversion step and causes said output step to output the image data after entering the ID for specifying the image data by said entering step.

* * * * *

UNITED STATES PATENT AND TRADEMARK OFFICE
CERTIFICATE OF CORRECTION

PATENT NO.   : 6,229,620 B1
DATED        : May 8, 2001
INVENTOR(S)  : Hideyuki Makitani et al.

It is certified that error appears in the above-identified patent and that said Letters Patent is hereby corrected as shown below:

<u>Column 8,</u>
Line 28, "no" should read -- not --

Signed and Sealed this

Thirtieth Day of April, 2002

Attest:

JAMES E. ROGAN
*Attesting Officer*     *Director of the United States Patent and Trademark Office*